United States Defensive Publication [19] (H) [11] T102,602

Isom et al. [43] Jan. 4, 1983

[54] CULTURE OF FRESHWATER MUSSEL GLOCHIDIA IN AN ARTIFICIAL HABITAT UTILIZING COMPLEX LIQUID GROWTH MEDIA

[76] Inventors: Billy G. Isom, Rte. 3, Box 444, Killen, Ala. 35645; Robert G. Hudson, Rte. 1, Box 202, Clinton, S.C. 29325

[21] Appl. No.: 328,307

[22] Filed: Dec. 7, 1981

[51] Int. Cl.[3] ..... A01K 61/00

[52] U.S. Cl. ..... 119/4

[57] ABSTRACT

A process, and a composition of matter utilized therein, to obtain transformation of the glochidia of freshwater mussels to the juvenile stage. In nature, glochidia normally transform while as parasites on fish. The instant artificial process involves the use of cell culture and bacteriological techniques to best assure environmental integrity during the protracted culture period. The composition of the media includes a combination of the blood serum of fish and commonly available tissue culture fluids and inorganic salts. A nonspecific component of fish serum in combination with the media supra was determined to be essential for glochidial transformation to juveniles.

9 Claims, No Sheets Drawing,

22 Pages Specification

The file of this unexamined application may be inspected and copies thereof may be purchased (849 O.G. 1221, Apr. 9, 1968).